(No Model.)

W. H. BRUNING.
COFFEE ROASTER.

No. 310,027. Patented Dec. 30, 1884.

WITNESSES:
INVENTOR:
W. H. Bruning
BY
ATTORNEYS.

UNITED STATES PATENT OFFICE.

WILLIAM H. BRUNING, OF MADISON, INDIANA.

COFFEE-ROASTER.

SPECIFICATION forming part of Letters Patent No. 310,027, dated December 30, 1884.

Application filed March 19, 1883. Renewed August 19, 1884. (No model.)

*To all whom it may concern:*

Be it known that I, WILLIAM H. BRUNING, of Madison, in the county of Jefferson and State of Indiana, have invented a new and Improved Coffee-Roaster, of which the following is a full, clear, and exact description.

The object of the invention is to improve coffee-roasters, as hereinafter described, and pointed out in the claims.

Reference is to be had to the accompanying drawings, forming part of this specification, in which similar letters of reference indicate corresponding parts in both the figures.

Figure 1:
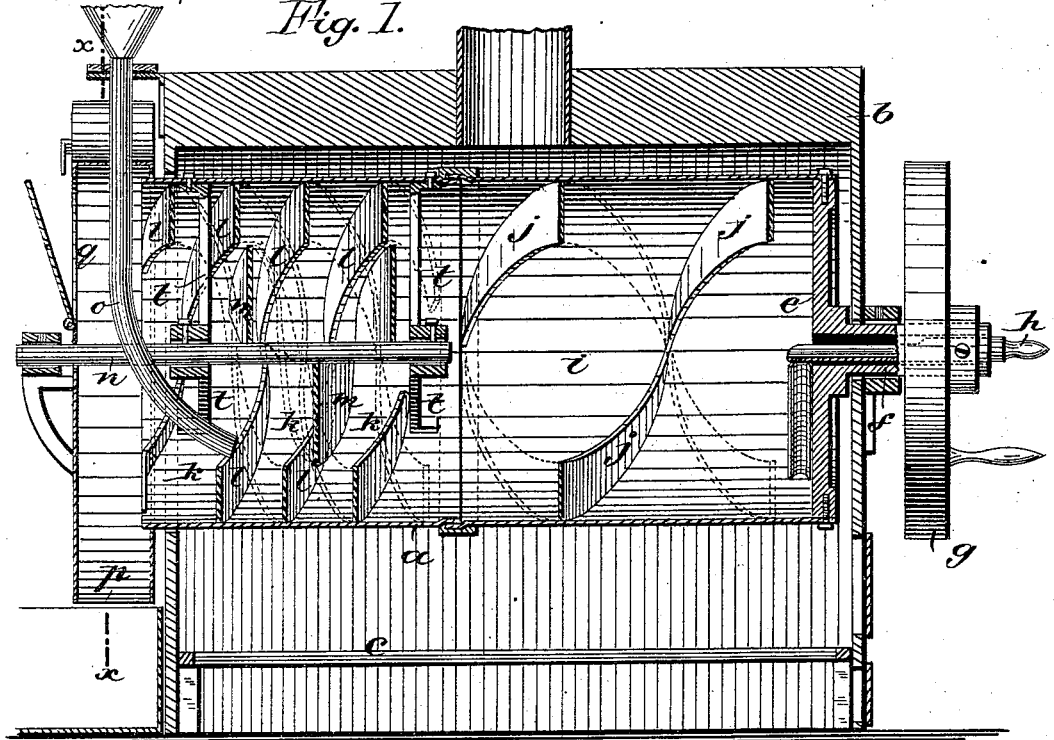
Figure 2:
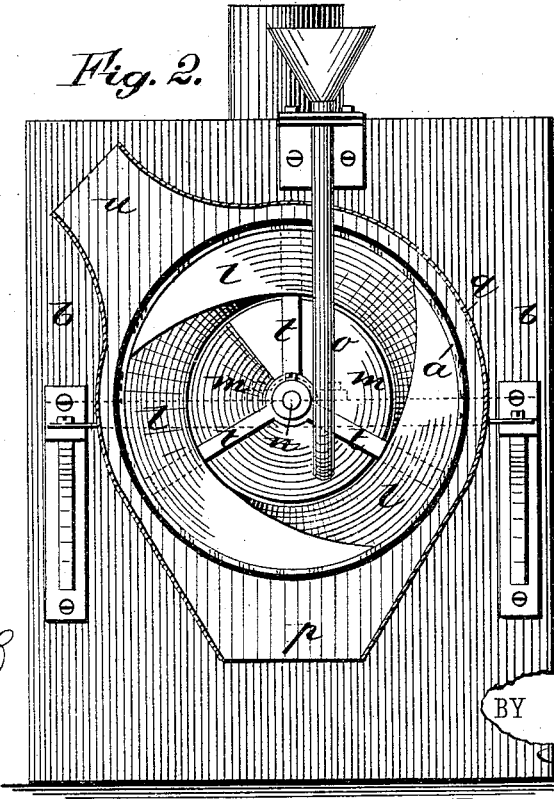

Figure 1 is a longitudinal sectional elevation of my improved coffee-roaster, and Fig. 2 is a transverse section of Fig. 1 on the line $x\,x$.

The shell $a$ of the hollow revolving cylinder may be of the ordinary form, and arranged in the usual way in an inclosing-case, $b$, over a fire-grate, $c$, for heating it; and it may have the ordinary head $e$, hollow shaft $f$, driving-pulley $g$, and the removable testing-scoop $h$ at one end. The part $i$ of the cylinder, which is similar to an ordinary coffee-roaster, is where the coffee or other substance to be roasted is to be retained while roasting, and it is provided with a spiral flange, $j$, for ejecting the contents when the motion of the cylinder is reversed after the roasting is completed. In the other section, $k$, of the cylinder, and extending a suitable distance from the open end, I have arranged the spiral flange $l$, attached to the shell $a$, and another one, $m$, attached to the shaft $n$, to conduct the coffee from the feeding-spout $o$ into part $i$ of the cylinder, or retain it there until the roasting is completed. The motion of the cylinder is then reversed, when these flanges, receiving the contents from section $i$ by flange $j$, will quickly discharge the same into the hopper-bottom $p$ of the smoke-breeching $q$, to be discharged into any receptacle. The flange $j$ is adapted to allow the contents of the cylinder to fall back over it from the closed end of the cylinder, and is used only to effectually discharge the coffee from section $i$ to section $k$. The shaft $n$ is connected to this section $k$ by the two spider-frames $t$, attached to the interior of the cylinder. The smoke-breeching $q$ has a pipe-connection, $u$, for attaching a pipe to conduct the smoke away.

By the construction of the discharging-hopper and the smoke-breeching in one device the apparatus is simplified, and the opening at the bottom facilitates a draft by which the smoke is effectually carried off.

Having thus described my invention, what I claim as new, and desire to secure by Letters Patent, is—

1. A coffee-roasting cylinder divided into two sections, $k\,i$, the section $k$ provided with spiral flanges $l$, and the section $i$ having the spiral flange $j$, in combination with the shaft $n$, having the spiral flange $m$, whereby the coffee may be conveyed through section $k$, held and roasted in section $i$, and discharged, as described.

2. The combination, with a roasting-cylinder having the spiral flanges $l$, and the shaft $n$, having the flange $m$, of the hopper having the bottom $p$, arranged at the end of said cylinder, as shown and described.

3. An open-ended roasting-cylinder provided with a spiral conveyer leading from one end toward the middle, and with spiral flanges adapted to prevent the escape therefrom of the coffee or other article until the cylinder's direction of rotation has been reversed, as described.

WILLIAM H. BRUNING.

Witnesses:
R. M. MILLICAN,
LEONARD JOEST.